July 11, 1944.　　　K. R. KARLSON　　　2,353,311
BAG AND METHOD OF MAKING SAME
Filed May 26, 1941　　　2 Sheets-Sheet 2

Inventor
Karl R. Karlson,
By Ron O'Huney
Attorney

Patented July 11, 1944

2,353,311

UNITED STATES PATENT OFFICE 2,353,311

BAG AND METHOD OF MAKING SAME

Karl R. Karlson, Montclair, N. J., assignor to Union Bag & Paper Corporation, New York, N. Y., a corporation of New Jersey Application May 26, 1941, Serial No. 395,308

1 Claim. (Cl. 93—35)

Of my copending applications, filed of even date herewith, Ser. No. 395,306 discloses a bag and method of sealing; Ser. No. 395,305 discloses a method of slitting and coating paper for the formation of bags; and Ser. No. 395,307 discloses an apparatus for carrying out the method disclosed in the first-mentioned application.

The bag disclosed in this present application may be, but need not be, formed from material formed in accordance with my application Ser. No. 395,305, and is usable in the process of my application Ser. No. 395,306 and on the apparatus of my application Ser. No. 395,307.

It is an object of my invention to provide a bag having a preformed bottom capable of being sealed by heat and pressure after the bag is filled.

It is a further object of my invention to provide, in such a bag, a disposition of thermoplastic material which will have optimum response to the heat sealing operation.

It is a further object of my invention to provide, in a bag of the type discussed, a disposition of thermoplastic material which will, under heat and pressure, seal all possible leakage points in the bag bottom.

It is a further object of my invention to provide a method of manufacturing bags as aforesaid which will permit the manufacture of such bags on standard bag making equipment.

These and other objects will be made clear from the following description taken in connection with the annexed drawings in which:

Fig. 4 is a view similar to Fig. 1 showing optimum distribution of adhesive areas.

Figure 1:
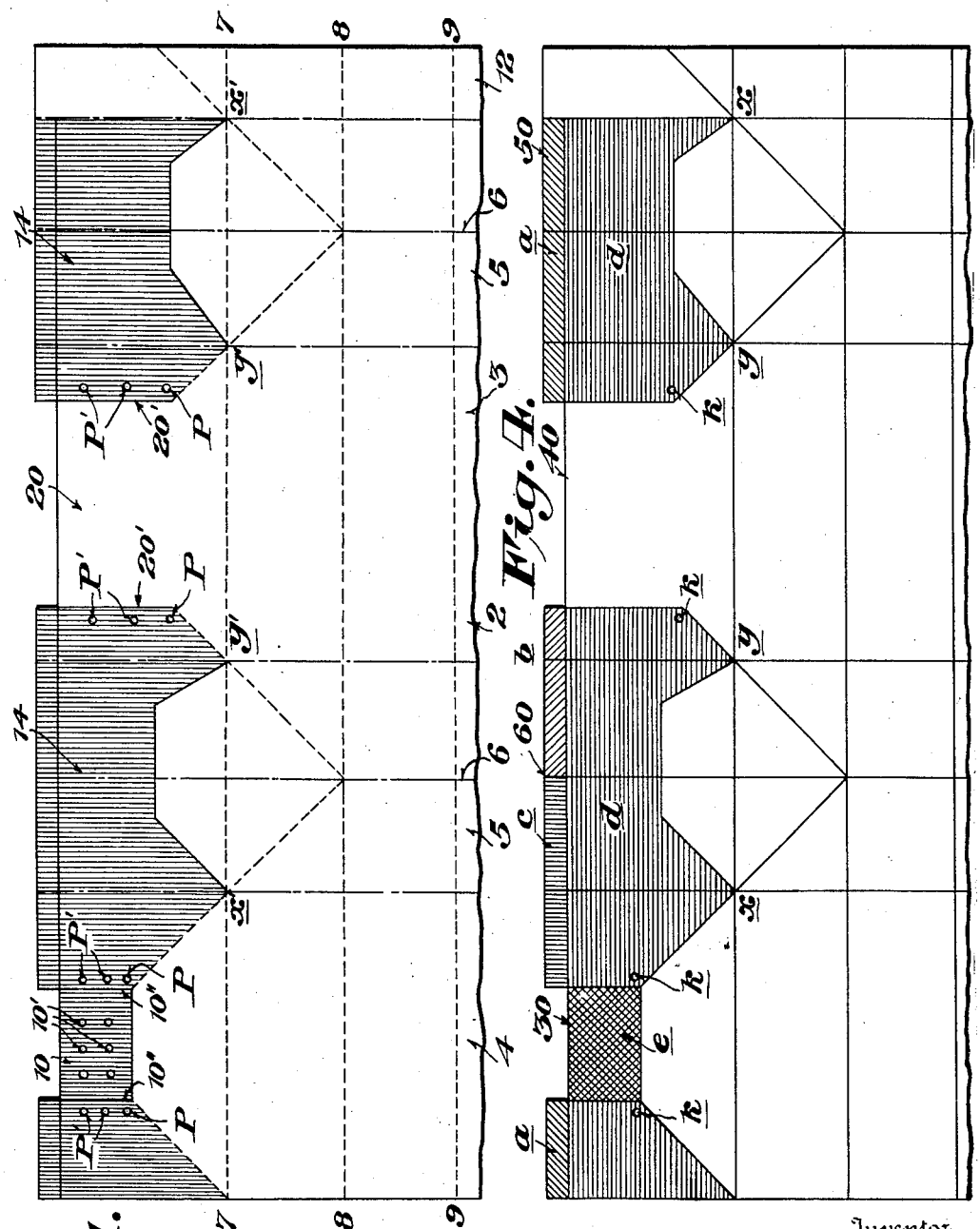
Figure 1 is a plan view of a developed bag blank showing score lines and adhesive areas.

In my present invention, I intend to secure the bag bottom, during manufacture, only with sufficient strength to stand handling and filling. As they come from the factory, the bag bottoms will not be sealed any more securely than ordinary bag bottoms. When, however, the bags are opened and filled, and the bottoms are then pressed against a hot surface, as disclosed in my application Ser. No. 395,306, the thermoplastic material between the several plies will fuse, and flow into perfect conformity with the parts to form a perfect seal.

In the formation, on a gusseted tube, of a bottom of the automatic type there will, at one point or another, occur a superimposition of as many as six plies of material, and therefore any attempt to bring about a sealing by means of heat and pressure applied to the exterior of the bottom will encounter a considerable temperature gradient from the outermost to the innermost ply. The limiting factors, of which account must be taken, are, first, the maximum temperature to which the outermost ply can be subjected without detrimental effect on its material; second, the amount of pressure to which the superimposed plies may be subjected; third, the basis weight and characteristics of the several plies (which will determine for any given set of conditions the temperature gradient between the outermost and the innermost ply); and, fourth, the amount of time which can economically be allowed at the particular sealing station.

Practical operations must be kept within both the physical and economical limitations imposed by the above factors. A bag filling and closing machine, in order to merit commercial consideration, must handle a minimum of thirty bags per minute and many of such machines handle forty or more per minute. Allowing for the time occupied in moving the bag from one station to another, this means that, at best, very little more than a second can be devoted to the heating and pressing of each bag bottom.

The upper limit of temperature depends on the character of the paper and also on the character of the thermoplastic material applied thereto. It is not infrequently the case that the application of certain thermoplastic materials to paper will raise by many degrees the tolerance of the sheet to temperature. Assuming that, in the usual case, maximum temperature will be desired, it must be determined experimentally for each combination of paper and thermoplastic.

Similarly, the pressure which can be applied has an upper limit. It may not, for example, be great enough to damage the contents of the bag, nor must it induce a bursting stress in the bag walls by "hydrostatic" effect. Even with the bag walls well supported against bursting, the pressure may not be great enough to cause wrinkling or scarring of the bag walls. There is, however, no universal maximum.

Assuming a working temperature of, say, 375° F. applied to the exterior of the bag, the temperature effective between the innermost ply and the adjacent ply will be considerably less and will not be attained so quickly as the 375° is attained by the outer ply. Accordingly, a thermoplastic material which, if adjacent to the outer ply, would be brought to a condition of extreme fluidity at the sealing station, might be altogether ineffectual if it were too far removed from the source of heat.

Too great a degree of fluidity is undesirable since an effective portion of the thermoplastic may, under such conditions, be lost by absorption into the pores of the paper. Accordingly, the thermoplastic between the two outermost plies should have very different characteristics from the thermoplastic placed between the two innermost plies. By the use of my invention, the proper type of thermoplastic material is brought into position between each pair of plies, having regard for the extent to which such material is removed from the source of heat during ultimate sealing.

While optimum results will be attained by differentiating the material printed on the several areas in accordance with the position of such areas in the final bag bottom, considerable value attaches to the preprinting idea even though all preprinted areas are covered with the same material, and such material is identical with the coating of the interior surface of the bag. The most essential point is to have the thermoplastic material where it is needed.

Figure 2:
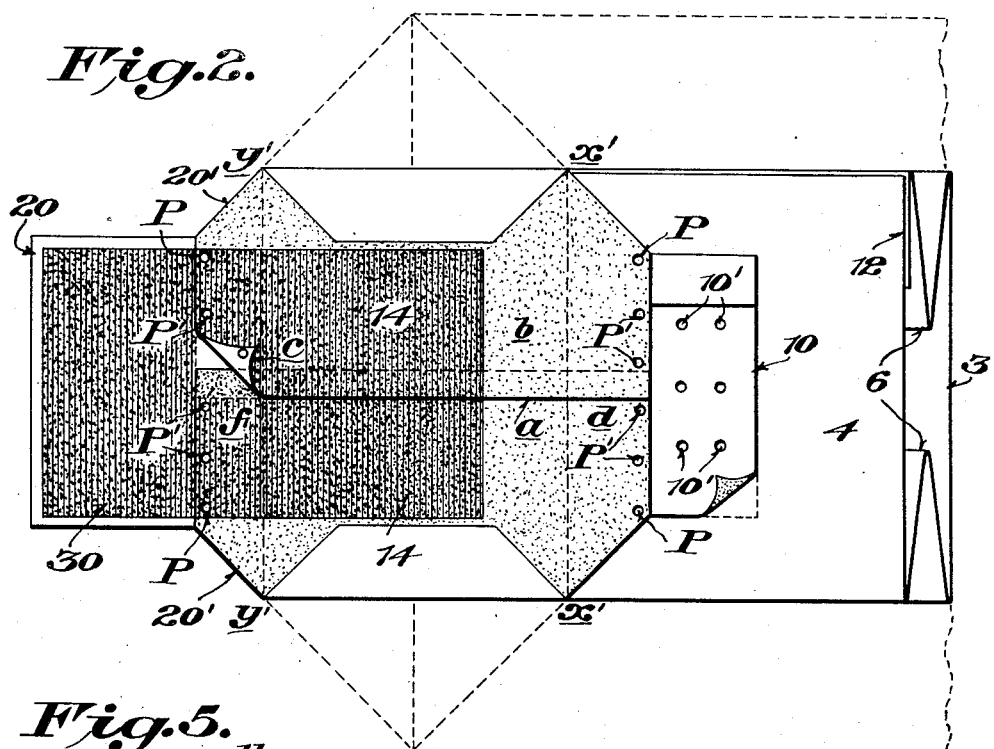
Fig. 2 is a perspective view of the bag bottom in partially folded condition.
Figure 5:
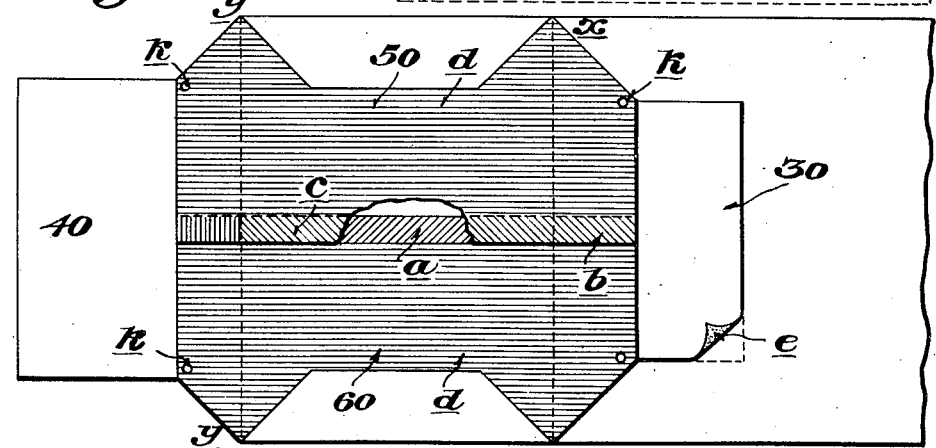
Fig. 5 is a view similar to Fig. 2 showing the location of the areas of Fig. 4 as they appear in the folded bag bottom.
Figure 3:
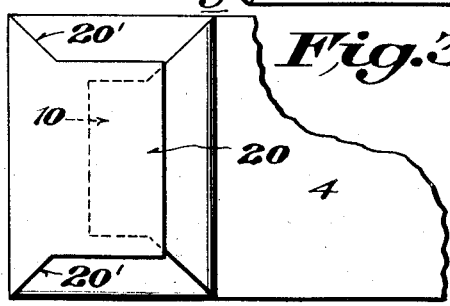
Fig. 3 is a perspective view of a completed bag bottom.

In Figs. 1, 2 and 3 I have illustrated the preprinting of undifferentiated areas of thermoplastic material. In Figs. 4 and 5 I have illustrated the use of differentiated areas.

The practical problem of the printing operation will determine the extent to which differentiation will be carried. Naturally, each type of thermosplastic material will have to be applied as a separate printing step and in most cases there will be a practical point beyond which the addition of printing steps necessitated by further differentiation would so complicate and slow the process as to outweigh the benefits to be derived from the additional differentiation. This limitation may not be precisely expressed and it has been my effort in this application to illustrate sufficient differentiation to clarify the principle and to enable anyone skilled in the art to apply the principle to any particular commercial problem.

In Fig. 1 I have shown a web 2 and have indicated thereon all of the scoring and slitting lines which occur in the formation of an automatic type bottom on a gusseted tube. Longitudinal score lines divide the bag into panels forming a front wall 3, a rear wall 4, and side walls 5 which, in turn, are medially scored at 6 to form the gussets. Transverse score lines 7, 8 and 9 prepare the material for the backward folding which will be necessary to draw the tube into a bottomed condition. Longitudinal slits 20′ in the end of the front wall 3 form a closing flap 20 which will become the outermost flap of the bag bottom. Similarly slits 10′ in the rear wall 4 define a flap or tab 10 which will lie just below the flap 20 in the final bottom.

The web 2, shown in Fig. 1, is formed by conventional means into a gusseted tube in which the marginal panel 12 is secured to the inner surface of the front wall 4 to form a longitudinal seam. This tube is preferably formed of sheet material treated in accordance with my aforesaid application Serial No. 395,305.

As shown in Fig. 2 the flap 20 remains in the plane of the front wall 3, and the flap 10 is drawn backwardly into the plane of the rear wall 4. Flaps 14 formed from the material of the gusseted walls together with the adjacent material of the front and rear walls lying between the gusseted walls and the slits of the tabs 10 and 20 fold inwardly into what is preferably, but not necessarily, overlapping relation. As shown in Fig. 1, these flaps 14 are slightly longer and therefore project beyond the tabs 10 and 20 so as to assure an overlap.

When the bottom is thus designed, it is immaterial whether or not the gussets be present as such. I have illustrated in dotted lines, Figs. 2 and 3, the effect of dispensing with the gussets to form what is known in the trade as a "satchel bottom" bag. This will make it clear that the only difference between a satchel bottom bag and the so-called "automatic" bag lies in the fact that in the former the material of the gussets is folded outwardly rather than inwardly. The bottoms are, however, identical so far as this invention is concerned.

It must be borne in mind that one entire surface of the web 2 is already coated with thermoplastic material and that this surface forms the interior of the tube. Material thus coated will, under the action of heat and pressure, seal to a similar surface, but unless an exorbitant amount of coating has been applied no seal will be formed between a coated and an uncoated surface. I propose to apply to certain portions of the reverse side of the web, an area or areas of thermoplastic material so proportioned and located that these areas will be in a position to cooperate with each other and with exposed portions of the interior surface of the web so as to produce a heat seal when the bag is filled and its bottom is pressed against a hot surface.

There is no essential difference between printing and coating. When the entire surface of a web is covered, we speak of the operation as "coating". When only small localized areas on a web are covered, we speak of it as printing. The actual mechanical task of applying the material will usually be carried out in much the same way and by much the same means. As used herein, the term "printing" is used to denote the application of thermoplastic material to localized areas and is intended to include any and all means of applying such material, including the application of the material as a hot melt and also in the form of a solution.

Because, as will presently be made clear, a portion of the material will, until the bottom is formed, lie within the gusset folds, it is essential that the printed material shall be brought to a solid condition before the web is subjected to the action of the tuber. The printing step may take place as a part of the bag-making operation and be performed on the web just in advance of the tuber, but it is also entirely possible to perform the printing operation as a wholly separate step and to rewind the printed web preparatory to supplying such a web in rolls to a conventional bag machine. In the latter case it is, of course, necessary to provide some sort of compensator to synchronize the occurrence of the printed areas with the action of the cutoff mechanism and the bottoming mechanism. Compensators for this purpose are, however, well known and in general use.

In connection with the preprinting of thermoplastic, it must be kept in mind that the usual bag will also carry ordinary or ornamental printing on its exterior. Where such ornamental printing is done as a separate operation followed by rewinding of the web, means must be provided on the bag machine to synchronize the cut-off mechanism with the printing of each bag. In such a case, therefore, the printing of the thermoplastic must either be done as part of the ornamental printing step or on the bag machine by means rigidly synchronized with the cut-off.

In Figs. 1 and 2 I have shaded the areas to which preprinted material must be applied but I have not subdivided these areas for the purpose of differentiating between different kinds of adhesive. The mathematics of the bag bottoming operation is such that the material of the front and rear walls will, when the bottom is opened out as in Fig. 2, always fold along 45° diagonal lines. The areas which must be covered are as follows:

1. On the front wall, all of the material lying outside slit lines 20' and above the diagonal fold lines;
2. On the rear wall, all of the material lying outside the score lines 10' and above the diagonal fold lines and all of that portion of the flap 10 lying between its extremity and the termini of the slits 10';
3. On the side or gusset walls, all of the material lying between the extremities of the walls and a horizontal line parallel with the inner extremities of the slits 20' and diagonal lines normal to the diagonal fold lines of the front and rear walls.

The provision of preprinted bodies of thermoplastic material along the lines $x'—x'$ and $y'—y'$ of Figs. 1 and 2 and along the lines $x—x$ and $y—y$ of Figs. 4 and 5 is of particular importance. In the course of manufacture, the tube is gripped and squeezed with enormous pressure along these lines. Any adhesive which is in liquid condition at the time the gripping operation takes place will have its effect destroyed by the mechanical pressure of the grippers which either drives the paste out of position by extruding it between the plies or renders it ineffectual by forced absorption of the liquid into the pores of the paper. By my invention, however, the bodies of thermoplastic are established in the requisite positions and in solid condition. This material will not therefore be dislodged by the grippers and will provide completely sealed areas at points where they are most needed when the bag is ultimately sealed.

With the bag in the condition shown in Fig. 2 and with the printed thermoplastic in the position indicated, adhesive material is applied to the bag bottom and particularly to the flap 20 over the area 30 indicated by dotted lines in Fig. 2. The flap 10 is then folded into the plane of the bottom along the line $x'—x'$ and flap 20 is then folded along the line $y'—y'$ and pressed down upon the previously folded flap 10. The adhesive in the area 30 serves to secure the bottom sufficiently to permit shipping and handling and indeed represents substantially the normal and ordinary method of securing bottoms of this type. The adhesive aplied to the area 30 should be thermoplastic and the solvent in which it is applied should be miscible with the thermoplastic material of the printed area and may, of course, be identical. It will be advantageous if the thermoplastic materials be selected so as to have a tendency not only to be miscible with the solvent but to be absorptive of the solvent and its vapor. The adhesive applied in solution will come to rest under a highly impervious surface and evaporation of the solvent will therefore be quite slow and any absorption of the solvent by the adjacent thermoplastic areas will serve to reduce the drying time which must elapse before the bags can be handled.

In Figs. 1 and 2 I have shown perforations P adjacent the intersection of the slits in the front and rear walls with the diagonal fold lines. These perforations are intended to permit penetration by the liquid adhesive in the area 30 and to facilitate the travel of such adhesive toward the aforementioned intersection point. These intersection points are the most difficult to close in bottoms of this type, and the provision of a quantity of adhesive at or immediately adjacent these points greatly improves the reliability of the bag bottoms.

I have also provided perforations P' extending adjacent to the slits forming flaps 10 and 20 and in flap 10 I provide a group of perforations 10'. These likewise permit passage of the solution applied to the area 30. The solution passing through the perforations P' serves to prevent dislodgment of the flaps 14 and also to minimize filtration of the bag contents into the bottom folds after filling and before heat sealing the bag bottom. The solution passing through the perforations 10' forms "keys" of adhesive greatly strengthening the bond between flaps 10 and 20.

The perforations must be made in the web before it reaches the tuber, and the perforating step, therefore, must be done at the same time as the printing steps in order to assure proper conformity with the cut-off device on the bag machine.

In Figs. 4 and 5 I have illustrated the principle of differentiating the characteristics of the adhesive applied to various portions of the necessarily printed area as discussed in connection with Figs. 1 and 2, and I have designated these areas $a$, $b$, $c$, $d$ and $e$ in the sequence in which they run from the interior to the exterior of the bottom. Accordingly, the thermoplastic material applied to area $e$ will have a higher melting point than that applied to the area $d$ which in turn should have a higher melting point than that applied to area $c$ and so on. In these figures, 40 is the outermost flap formed from the material of the front wall, and 30 is the flap formed from the material of the rear wall. Naturally, in selecting the various types of thermoplastic, care should be taken to insure that the various materials selected are mutually compatible and that where one is brought into contact with another the two shall be capable of forming a seal.

It will be noted in Figs. 4 and 5 that I have provided perforations $k$ which have a function identical with that of the perforations P shown in Figs. 1 and 2.

However the thermoplastic material or materials be chosen, if they are applied to a bag already coated on its interior with a thermoplastic substance, it will be entirely possible to close the bag bottom by applying to the surfaces to be overlapped a solvent capable of dissolving and/or softening both the coating material and the preprinted material. If such a solvent is applied, the subsequent folding and pressing of the flaps will result in a softening of the opposed surfaces of the thermoplastic material and the formation of a sufficient seal to hold the bag together for the purpose of shipping and filling.

In this case, while the provision of perforations adjacent the intersection of the flaps formed from the gusseted walls with the flaps formed from the front and rear walls may be helpful, it is not indispensable, since there will be, at those intersection points, thermoplastic material available on both of the contacting surfaces.

When a solvent is applied rather than an adhesive in solution, the drying step is enormously expedited since the amount of solvent present can be reduced to an absolute minimum and will promptly lose its liquid character by absorption in the adjacent thermoplastic surfaces.

While I have disclosed certain specific embodiments of my invention, I do not intend to be limited to these embodiments but only as set forth in the subjoined claim which is to be broadly construed.

What is claimed is:

A method of making bags which comprises providing a web of flexible material, applying to said web a group of bodies of thermoplastic material, the material of certain of said bodies having a lower melting point than that of the remaining bodies; forming said web into a bag having a preformed type of bottom containing a plurality of sets of overlapping areas; controlling such forming so as to bring the bodies having lower melting points between the inner contacting sets of overlapped surfaces of said bottom, and the bodies having higher melting points between the outer contacting sets of overlapped surfaces of said bottom; and securing the outermost plies of said bottom by means of a liquid adhesive without thermal activation of said bodies whereby to produce a bag, closed mechanically but not hermetically, and capable of hermetic heat sealing after filling.

KARL R. KARLSON.